United States Patent [19]
Ruggiero et al.

[11] Patent Number: 5,191,694
[45] Date of Patent: Mar. 9, 1993

[54] CASSETTE ASSEMBLY LINE

[75] Inventors: Ralph Ruggiero; Thomas R. Plourde; Joseph Kaczynski, Jr., all of Tuscon, Ariz.

[73] Assignee: Shape Inc., Biddeford, Me.

[21] Appl. No.: 725,480

[22] Filed: Jul. 3, 1991

[51] Int. Cl.⁵ .......................................... B23P 21/00
[52] U.S. Cl. ...................................... 29/430; 29/711; 29/792; 29/806
[58] Field of Search ................. 29/33 J, 33 P, 33 Q, 29/33 S, 430, 436, 564.3, 711, 792, 806; 242/56 R, 56 A; 83/203, 267, 410.8, 411.3, 411.7, 948, 263

[56] References Cited

U.S. PATENT DOCUMENTS

| | | | |
|---|---|---|---|
| 3,669,372 | 6/1972 | DeJong | 242/55 |
| 3,930,296 | 1/1976 | Hoover | 29/806 |
| 4,114,252 | 9/1978 | Kon et al. | 29/806 X |
| 4,313,551 | 2/1982 | Umehara | 226/196 |
| 4,330,925 | 5/1982 | Kato et al. | 29/464 |
| 4,373,840 | 2/1983 | Miller, Jr. | 414/225 |
| 4,452,404 | 6/1984 | Gelardi et al. | 242/71.8 |
| 4,466,530 | 8/1984 | Stückler | 198/472 |
| 4,475,700 | 10/1984 | MacLeod, Jr. et al. | 242/197 |
| 4,501,527 | 2/1985 | Jacoby et al. | 414/225 |
| 4,506,777 | 3/1985 | Kampf | 198/341 |
| 4,512,904 | 4/1985 | King | 242/56 R |
| 4,533,093 | 8/1985 | Gelardi et al. | 242/197 |
| 4,569,492 | 2/1986 | Gelardi et al. | 242/199 |
| 4,572,450 | 2/1986 | Lindquist | 242/56 R |
| 4,606,513 | 8/1986 | Gelardi et al. | 242/199 |
| 4,614,018 | 9/1986 | Krall | 29/335 |
| 4,619,141 | 10/1986 | Yashieda et al. | 73/865.9 |
| 4,662,579 | 5/1987 | Gelardi et al. | 242/199 |
| 4,666,358 | 5/1987 | Wojciechowski | 414/223 |
| 4,676,710 | 6/1987 | Shiraishi | 414/225 |
| 4,695,215 | 9/1987 | Jacoby et al. | 414/225 |
| 4,864,710 | 9/1989 | Ogawa et al. | 29/806 X |
| 4,919,354 | 4/1990 | Huber et al. | 242/67.3 R |
| 4,957,247 | 9/1990 | Nakamura et al. | 242/67.1 R |
| 4,986,491 | 1/1991 | Gelardi et al. | 242/199 |
| 4,993,655 | 2/1991 | Gelardi et al. | 242/71.8 |
| 5,026,000 | 6/1991 | Gelardi et al. | 242/199 |
| 5,038,462 | 8/1991 | Dorner et al. | 29/806 X |
| 5,054,616 | 10/1991 | Gelardi et al. | 206/393 |
| 5,056,735 | 10/1991 | Gelardi et al. | 242/198 |

Primary Examiner—Mark Rosenbaum
Assistant Examiner—S. Thomas Hughes
Attorney, Agent, or Firm—Staas & Halsey

[57] ABSTRACT

A cassette assembly line including, a tape reel leadering and placement station having a table rotatable between reel supply, leader supply/clip/cutting and tape reel placement substations. The reel supply substation places unleadered tape reels in equally spaced relation on the rotary table. The table rotates to present unleadered tape reels to the leader supply/clip/cutting substation. A first reel is fed a leader supply, which leader is secured by a leader clip. The rotary table is then rotated so that the leader supply extends across a second and third tape reel, and leader clips secure the leader supply to the second and third tape reels. The leader is then cut between the second and third tape reels to form an exact length leader for the first and second tape reels. The leadered pair is then transferred to a cassette shell by the reel placement substation. In effect, the cut end still attached to the leader supply becomes the leader for the next pair. Thus, specific rotation of the rotary table and equal radial spacing of the tape reels serve to measure the leader predictability and reliably every time so that there is no variation in leader lengths from one cassette to another, which greatly facilitates subsequent automatic tape loading. Various other work stations are employed, such as a dust door insertion station. The entire assembly line is driven by a single drive motor and all operations are cammed to a single drive shaft.

5 Claims, 8 Drawing Sheets

CASSETTE ASSEMBLY LINE

BACKGROUND OF THE INVENTION

This invention relates to tape cassette assembly and, more particularly, to a method and apparatus for assembling tape cassettes.

Tape cassettes are usually assembled on an assembly line, wherein various components are installed in a cassette base or cover and the base and cover are mated.

As an example, a conventional VHS video cassette assembly line generally includes the following parts, the order of which may be varied, as known in the art: conveyor belts for moving cassette covers and cassette bases from station to station; a station for installing a multi-piece reel lock in the base; a station for installing a dust door and a dust door spring on the cover; a station for applying lubricant to posts on the base which receive plastic rollers; a station for installing the plastic rollers; a station for locating guidepost sleeves on other posts formed on the base; a station for removing a recording prevention tab from the base exterior; a station for correctly orienting the guidepost sleeves on the posts; a station for installing a dust door latch and spring into the base; a station for attaching a reel leaf spring on the cover; a station for installing a pair of leadered tape reels (without tape) into the cassette base, i.e., one end of a leader is applied to the hub of one tape reel and the other end of the leader is applied to the hub of the other tape reel; a station for installing a pressure flap in the base; and a station for mating and securing the cover and the base.

Once the cassettes are assembled, they are usually sold to another company which then automatically attaches blank tape to the leader and loads the cassette by winding the tape reels using a tape loading machine, such as described in U.S. Pat. Nos. 4,572,450 or 4,512,904. The cassette can then be sold as a blank cassette or recorded with, e.g., a movie and sold as a prerecorded tape cassette.

Despite the fact that millions of video cassettes are produced on such an assembly line each year, this line is characterized by the following drawbacks.

Specific to the leader application station, the leader is measured, cut and applied to the hubs via leader clips which catch the leader ends between the clips and corresponding recesses formed in the hubs, and then the tape reels are wound. The measuring, cutting and applying steps can be manual or automatic. The leader specifications set by JVC, the licensor of the VHS video cassette, are very strict regarding leader length because the automatic tape loading machines must be able to efficiently and quickly grasp the leader, attach tape thereto and load the tape in the desired length by winding the tape reels. Further, in conventional practice, the adjacent reels of respective pairs are spaced apart. A double cut is made between these pairs, which leaves about a 1¼ inch scrap of leader for each pair. This scrap represents a significant costly waste since millions of cassettes are manufactured.

However, the conventional manual or automatic methods of measuring, cutting and applying the leader often result in irregular leader lengths, thereby frustrating automatic tape loading, increasing rejects, increasing costs, decreasing output, etc.

More generally, this conventional assembly line is relatively slow, requires significant maintenance and operator assistance, takes up a large amount of space, and is relatively costly. Most importantly, the conventional system usually uses and arm which catches and indexes a shell along the assembly line. The arm then moves back to its original position and catches another shell, etc. This back-and-forth motion is redundant and takes up valuable assembly time.

Thus, the prior art still does not provide the most cost-or time-efficient assembly line for producing video cassettes.

SUMMARY OF THE INVENTION

Accordingly, it is a purpose of the present invention to provide a video cassette assembly line and related method of assembly capable of reliably, quickly and repeatedly applying an accurate length of leader to a pair of tape reels.

It is another purpose of the present invention to provide a video cassette assembly line which is quicker, requires less maintenance, is more compact and is less costly.

It is another purpose of the present invention to provide an assembly line which avoids repetitive back-and-forth movements by relying upon forward feeding of components only using, most particularly, continuous conveyors and a rotary table.

It is another object of the present invention to provide a device for more accurately applying a specific length of leader to a pair of tape reels.

Finally, it is a purpose of the present invention to provide a tape reel leadering and placement station which uses a rotary table to automatically measure, cut and apply the correct length of leader tape to a pair of tape reels.

To achieve the foregoing and other purposes of the present invention there is provided a video cassette assembly line including, a continuous conveyor moving past, among other stations, a tape reel leadering and placement station, using a rotary table movable between tape reel supply, reel orient, leader supply/clip/cutting, and tape reel placement substations. The reel supply substation continuously places unleadered tape reels adjacent each other in pairs on the rotary table at preferably five equally radially spaced positions, the rotary table rotates each unleadered pair counterclockwise past the tape reel orient station where the two tape reels of each unleadered pair are oriented so that recesses formed therein intended to receive the leader clips are correctly positioned. The table further rotates to present each pair of unleadered tape reels to the leader supply/leader clip/cutting substation. At the beginning of the leadering cycle the end of a leader supply is fed across the recess of a first tape reel in the clockwise position of an unleadered pair. A leader clip is simultaneously placed in the leader clip recess of the first tape reel. The rotary table is then rotated and the leader supply is fed across the respective recesses of a second tape reel in a following pair at the counterclockwise position, and a third tape reel at the clockwise position of that same pair. Clips are simultaneously placed in these recesses. The leader is then cut between the second and the third tape reels.

This specific rotation of the rotary table, as well as the radial spacing of the tape reels serves to measure the leader predictably and reliably every time so that there is no variation in leader length from one cassette to another, which greatly facilitates automatic tape loading.

The assembly line also includes other stations, such as a dust door supply station. The entire line is driven by a single drive motor and all stations are cammed to a single drive shaft.

The above-described invention results in faster video cassette assembly, for example 60 ppm, than conventional methods, for example, 30-40 ppm, takes up less space, requires less maintenance and operator assistance, and is less costly.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

The preferred embodiments according to the present invention will now be described with reference to FIGS. 1-6.

The present invention is an assembly line for producing VHS video cassettes. The line is generally indicated by reference numeral 10 in FIGS. 1A-1C and 2.

The line 10 includes various stations along its length. Although these stations are described in a particular order, said order is not mandatory since many of the stations may be transposed, as desired. For example, the pressure flap station can precede the dust door latch station. Of course, however, the closing station must come near the end of the line 10.

Figure 1A:
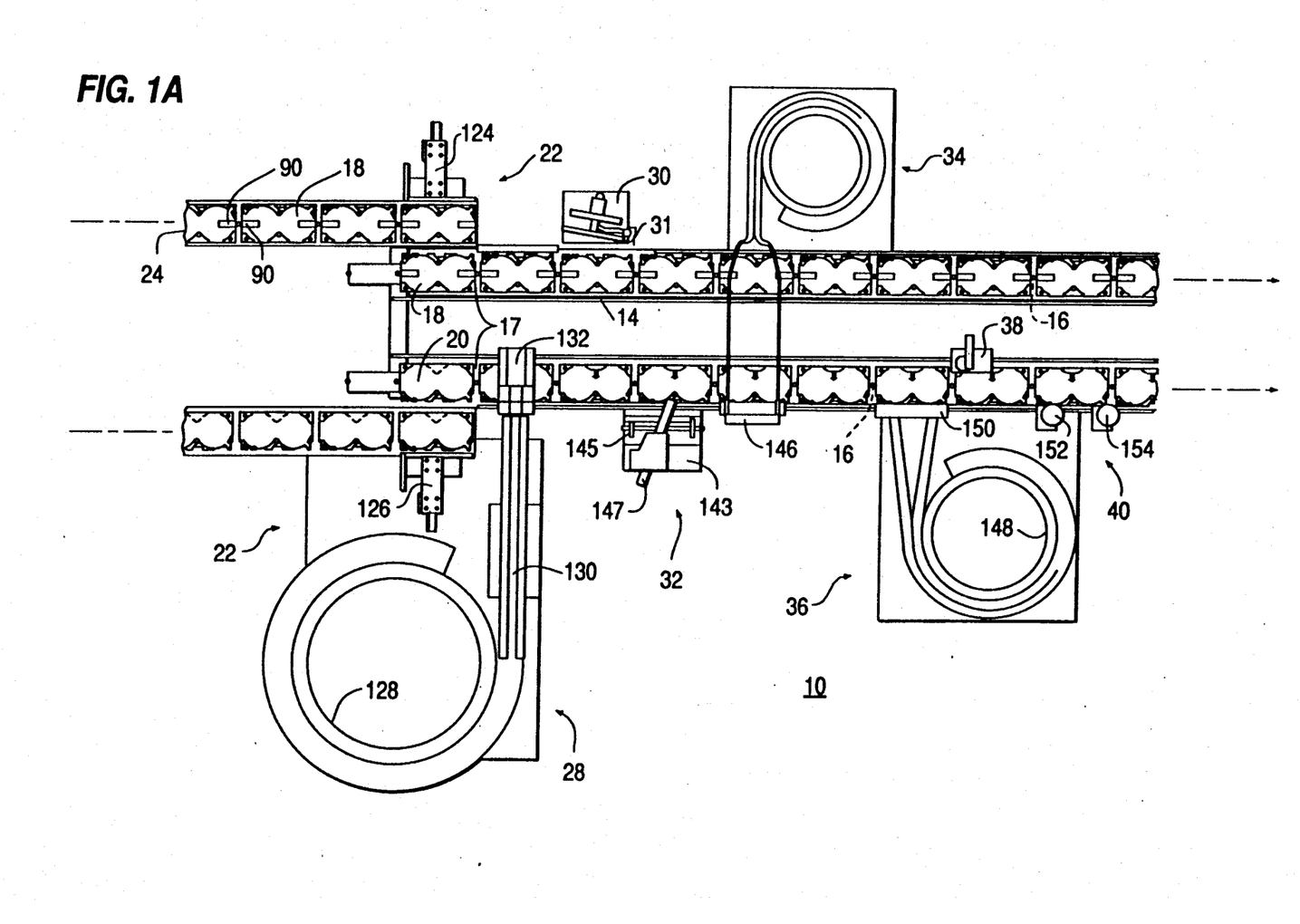
FIGS. 1A-C are plan views of a continuous assembly line according to the present invention.

As best shown in FIG. 1A, the line 10 generally includes a shell transfer system 12 including a main frame 14 and a main assembly conveyor 16 for continuously moving cassette shell covers 18 and bases 20, and completed cassettes 88 (FIG. 1C) along the line 10. The main assembly conveyor 16 includes two parallel open shell conveyor portions 17 and a closed shell conveyor portion 19. The line 10 also includes drive means 21 (FIG. 2) for moving the line 10 and its various stations; a shell shuttle station 22 for moving the shell covers 18 and bases 20 from respective first and second infeed conveyors 24, 26 to the main assembly conveyor 16; a reel lock station 28 for installing a reel lock in the base 20; a dust door station 30 for installing a dust door 31 on the cover 18; a pin lube station 32 for applying lubricant to posts on the base 20 which receive plastic rollers; a plastic roller station 34 for installing the plastic rollers; a guidepost sleeve station 36 for locating guidepost sleeves on other posts on the base 20; a tab knockout station 38 for removing a record prevent tab from the base 20 exterior; and a guidepost sleeve orient station 40 to correctly position the guidepost sleeves on the posts.

Figure 1B:
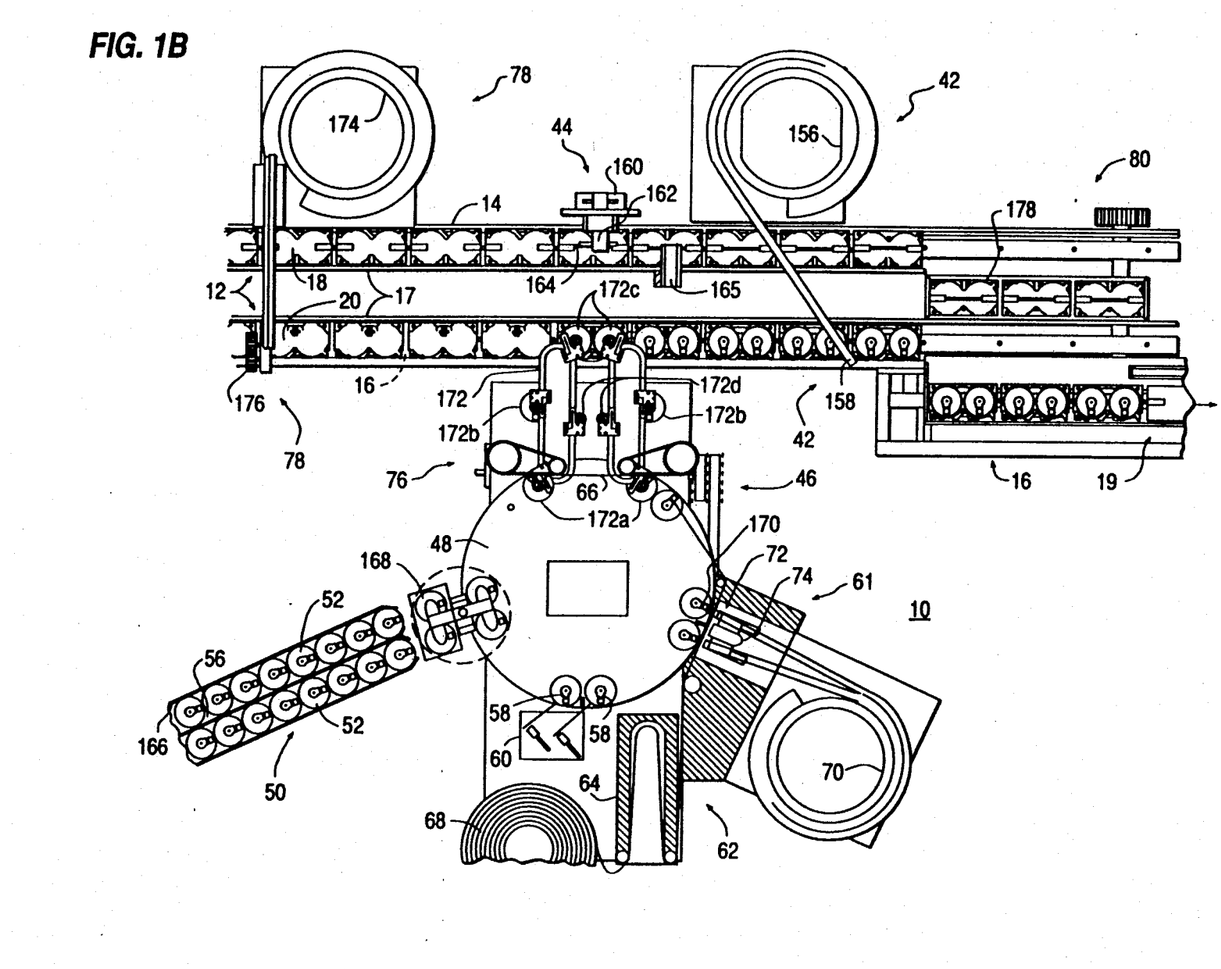

As best shown in FIG. 1B, showing the continuation of the line 10, there is also included a dust door latch station 78 for installing a dust door latch into the base 20; a reel leaf spring station 44 for attaching a reel leaf spring to the cover 18; a tape reel leadering and placement station 46 having a rotary table 48, a tape reel supply substation 50, including means 54 for transferring tape reels 52 from a tape reel supply means 56 to the rotary table 48, the reels 52 each including a recess 58 for receiving a leader clip 170, means 60 for orienting each tape reel 52 placed on the rotary table 48 so that each recess 58 faces radially outward, a leader supply/clip/cutting substation 61 including means 64 for feeding a leader supply 68 to the tape reels 52, a leader clip supply substation 70 including means 72 for applying the leader clip 170 to each tape reel 52 to fixedly connect the leader supply to each tape reel 52, means 74 for cutting said leader supply from said connected leader 66, and means 76 for transferring each leadered pair of tape reels 52 from the rotary table 48 to the main assembly conveyor 16; a pressure flap station 42 for installing a pressure flap in the base 20; and a closing station 80 for mating the cover 18 and the base 20.

Figure 1C:
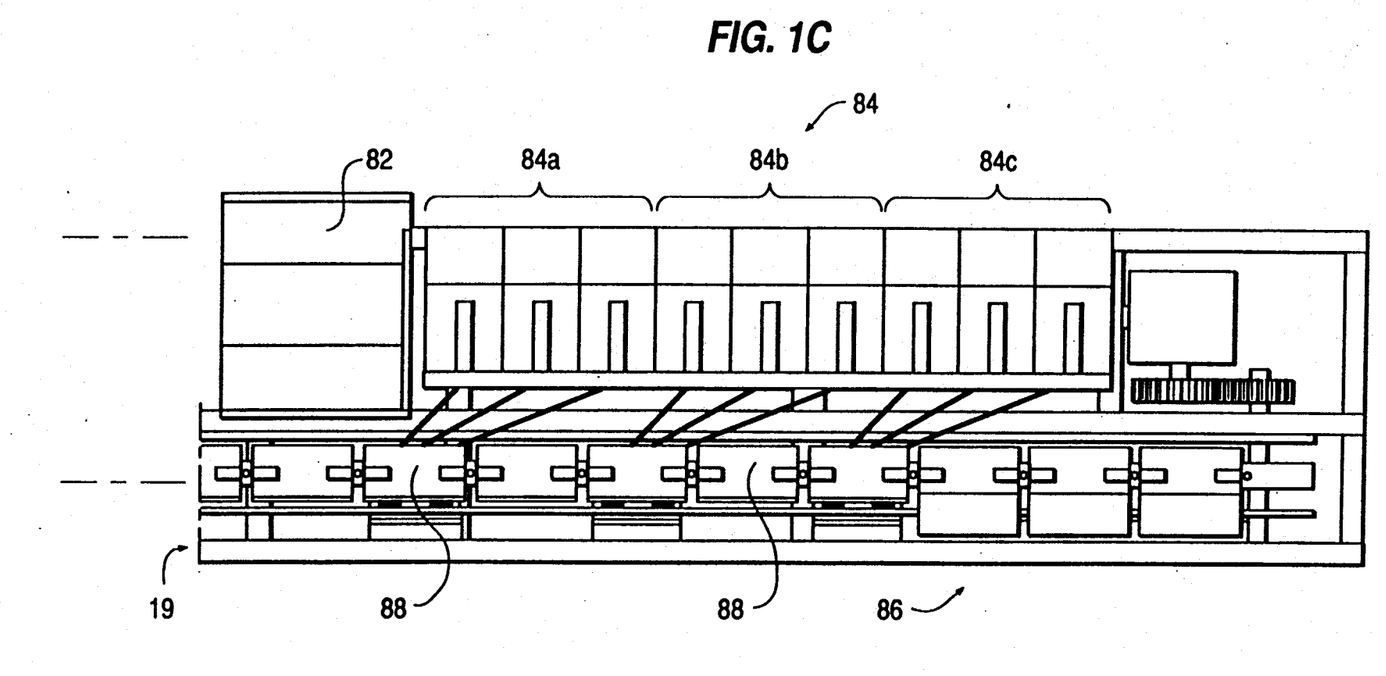

As shown in the continuation FIG. 1C, the line 10 also includes a reject station 82; a plurality of screw insert stations 84 for securing the cover 18 to the base 20; and a plurality of screw inspect stations 86. Each station is described more fully below.

This line 10 is a 60 part per minute semi-integrated automated assembly system for the manufacture of video cassettes 88. The line 10 is based on three separate types of automation to control the manufacture from mold to finished product: (1) mold automation; (2) material handling automation; and (3) assembly line automation.

The mold automation takes molded components from take-out robots and orients them for material handling automation. Some of the components are further assembled into subassemblies before being admitted to the material handling system, which then delivers these subassemblies and components for assembly line automation.

That is, cassette windows, dust door springs, and the tape reels are not assembled on the video assembly line 10, but are assembled beforehand and supplied to the line 10.

More particularly, the windows 90 can be attached to the cover 18 at a cover mold automation station (not shown), as described in Assignee's co-pending U.S. patent application Ser. No. 07/471,325, entitled "Removable Windows for Video Tape Cassette and Related Methods of Assembly", the disclosure of which is expressly incorporated herein. Once the windows are assembled on the cover 18, the cover 18 is moved to the first infeed conveyor 24.

Dust door springs 92 (FIG. 3) are attached to the dust door 31 at a separate dust door molding automation station (not shown). An example of such preassembly of the spring 92 on the dust door 31 is described in Assignee's U.S. Pat. No. 4,533,093, entitled "Tape Cassette Dust Door Spring Assembly and Method for Assembling Same", the disclosure of which is expressly incorporated herein. After assembly, the dust doors 31 with springs 92 attached are fed to the dust door station 30.

Multi-piece tape reels 52 are assembled on a stand-alone station (not shown) adjacent the tape reel supply means 56. These multi-piece tape reels 52 can be assembled as described in Assignee's co-pending U.S. Pat. Application Ser. No. 07/591,803, entitled "Tape Reel Assembly" or Assignee's U.S. Pat. No. 4,452,404, entitled "Tape Reel Hub Assembly", the disclosures of which are expressly incorporated herein. In either case, wear buttons can be included in the assembly of the multi-piece tape reel. Alternatively, the present invention also contemplates use of a one-piece tape reel, as described in Assignee's U.S. Pat. No. 4,993,655, entitled "One-Piece Tape Reel", the disclosure of which is expressly incorporated herein.

Preassembling the above-described components allows the assembly line 10 to be much simpler in design, considerably smaller in size and repair to individual stations is more efficient since the entire line 10 need not be shut down for repair. More particularly, with the present invention, all of the stations are modular and can be replaced with a minimum amount of effort and time. This allows the technicians to perform rebuilds or repairs to specific stations of the system without sacrificing production. Experience dictates that with conventional assembly lines necessary repairs have not be done in order to make production goals, but this actually increases the down time due to a higher frequency of repairs.

Not all of the components are transported by conveyors to the assembly line 10. As described below, some components are bulk loaded into feeders mounted on the line 10. Nevertheless, all of the system automation is matched for through-put.

Total system reliability is accomplished through the use of timing shafts and camshafts for both the mold and assembly line automation, as described below. This minimizes the possibility of a part for the line 10 from being in the wrong place at the wrong time because of an erroneous signal generated by a malfunctioning or misadjusted sensor. Sensors are used throughout the line 10 to determine if a component is placed properly.

A major contribution to system reliability is the basic work operations. All operations have been broken down to a simple one-two condition minimizing work performed during transfer dwell and allowing the system to run at a 60 ppm cycle time.

Each of the components and stations of the assembly line 10 will now be described in greater detail.

Figure 2:
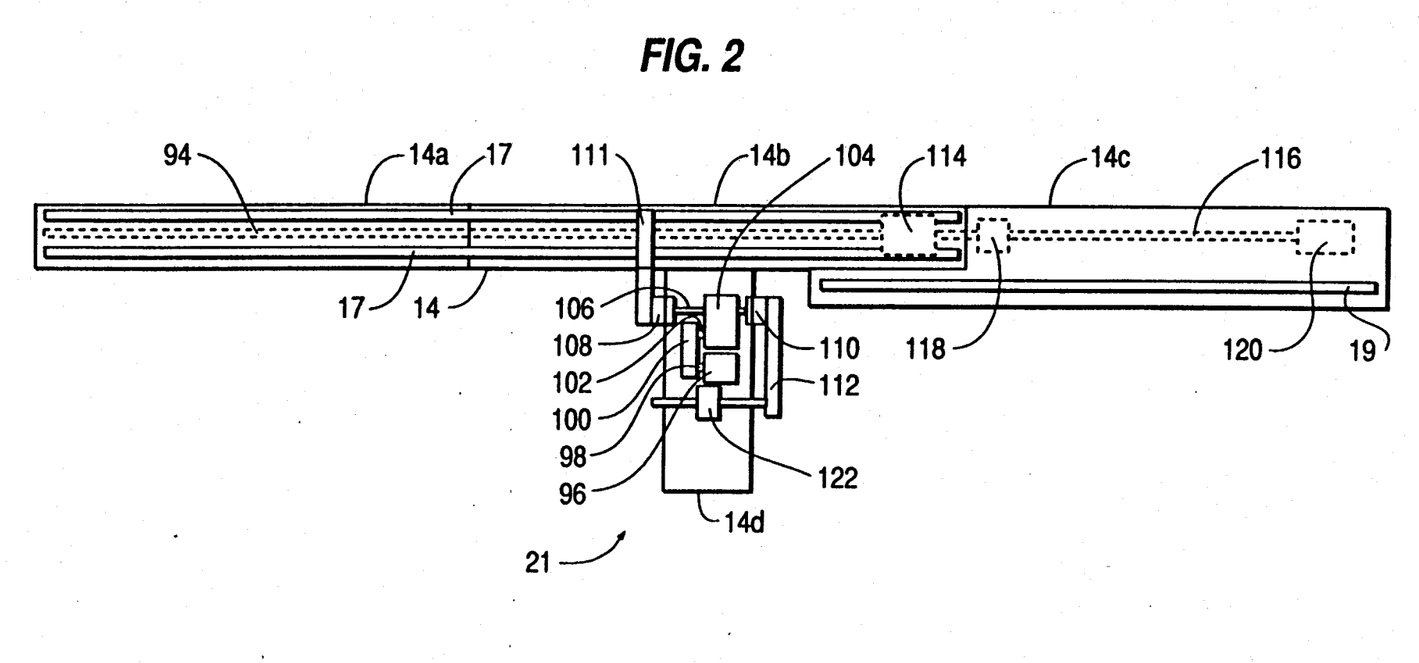
FIG. 2 is a schematic plan view of the shell transfer system according to the present invention.

As shown in FIG. 2, the line 10 is built around the main frame 14 which is a welded square tubular frame approximately 6700 mm long (22 ft.), 500 mm (19 in.) at the narrowest width and 1800 mm at the greatest width. Four smaller sub frames 14a, 14b, 14c, 14d bolt together to form the main frame 14. All of the work stations are, as stated above, modular in design and bolt to the main frame 14.

Contained within the main frame 14 is the drive means 21 including a central camshaft 94 and a motor 96. The motor 96 is, e.g., a 3 horsepower variable speed, frequency controlled AC motor. This motor's shaft 98 drives an assembly line drive belt 100. The belt 100 acts through a shaft 102 to a "30 to 1" speed reducer 104. The speed reducer 104 drives a power-take-off shaft 106 at 60 r.p.m. The motor 96 allows the operator to match the speed of the assembly line 10 with the conveyed components from the mold automation; it also allows for slow speed operation for maintenance and set up of overhauled stations.

There are two electric clutches connected to the shaft 106, an open shell conveyor clutch 108 and a tape reel leadering and placement station clutch 110. The clutch 108 is connected to a camshaft drive belt 111 and the clutch 110 is connected to a tape reel leadering and placement drive belt 112. This configuration allows the drive belt 100 (and central camshaft 94) or hub leadering and placement station 46, to run without the other or both to run together. All of the other stations are turned on and off by disengaging camshaft take-offs at each station. There is a pneumatic cylinder integral within the linkage that is used to disable each of the stations.

The drive means 21 also includes, as shown in FIG. 2, an open shell conveyor indexer 114; a closed shell camshaft 116; a closed shell conveyor reducer 118; a closed shell conveyor indexer 120; and a tape reel leadering and placement station indexer 122.

As described below, the video cassette 88 is assembled by placing the cover 18 and base 20 on the main assembly conveyor 16, indexing them by the work stations that install all of the internal components, closing the cassette 88 and installing screw fasteners. Thus, during each cycle the indexer 114 advances the conveyors 17 one unit length. This takes 40% of the cycle time which then allows 60% of the cycle time for dwell and work functions. At the maximum running speed of 60 parts per minute, the conveyors 17 travel takes place in 4 tenths of a second and dwell time (work time) is 6 tenths of a second.

The video cassettes 88 come in different formats, e.g., the Assignee herein offers "GT-120" TM (120 minute length), "GT-60" TM (60 minute length) and "Mailer" TM (low cost) versions of cassettes. The number of internal components in these formats varies and the line 10 compensates for this by allowing work stations to be turned on and off as required. Below is a list of components for these three suggested formats.

|  | GT-120 | GT-60 | MAILER |
|---|---|---|---|
| Cover | 1 | 1 | 1 |
| Base | 1 | 1 | 1 |
| Dust Door | 1 | 1 | 1 |
| Dust Door Spring | 1 | 1 | 1 |
| Window | 2 | 2 | 2 |
| Leaf Spring | 1 | 1 | 1 |
| Tape Reels |  |  |  |
| One Piece |  | 2 | 2 |
| Two Piece | 4 |  |  |
| Three Piece | 6 |  |  |
| Leader | 1 | 1 | 1 |
| Wear Button | 2 |  |  |
| Leader Clip | 2 | 2 | 2 |
| Pressure Flap | 1 | 1 |  |
| Reel Lock | 1 | 1 |  |
| Door Latch | 1 | 1 |  |
| Guide Roller | 2 | 2 |  |
| Guide Sleeve | 2 | 2 |  |
| Screw | 2 | 2 | 2 |

The following three components are directly transferred to the main conveyor 16: the base 20, cover 18 (with windows 90), and dust door 31 (with spring 92). The tape reels 52 are directly transferred to the tape reel supply substation 50.

The cover 18 (with windows 90) and base 20 are admitted facing up at the beginning of the infeed conveyors 24, 26, respectfully. If the assembly line 10 is not running, the covers 18 and bases 20 accumulate on the infeed conveyors 24, 26. As they accumulate, the infeed conveyors 24, 26 shut down one at a time to prevent scratching the covers 18 and bases 20.

When the assembly line 10 is started, product detect sensors (not shown) look for shell and component location. Stations that will not have a shell to insert a component into on the next cycle are turned off. The tape reel leadering and placement station 46 cycles until leadered tape reels 52 are ready to be inserted on the next cycle.

Each of the component insert stations will now be described in a suggested order of assembly, again with reference to FIGS. 1A–1C, and 3–5.

The shell shuttle station 22 includes two opposing pushers 124, 126 for simultaneously feeding pairs of shells, one a cover 18 and one a base 20, onto the open shell conveyor 17 from the infeed conveyors 24, 26. Both a cover 18 and a base 20 must be present for a shuttle to occur.

At the reel lock station 28, a reel lock (not shown), such as the one described in Assignee's co-pending U.S. Application Ser. No. 07/389,906, entitled "Integral Actuator/Reel Lock/Spring", the disclosure of which is expressly incorporated herein, is fed from a vibratory bowl 128 to a linear feeder 130 and then to a singulator insert mechanism 132. A base 20, indexed into position, is restrained from movement during the reel lock insertion.

Figure 3:
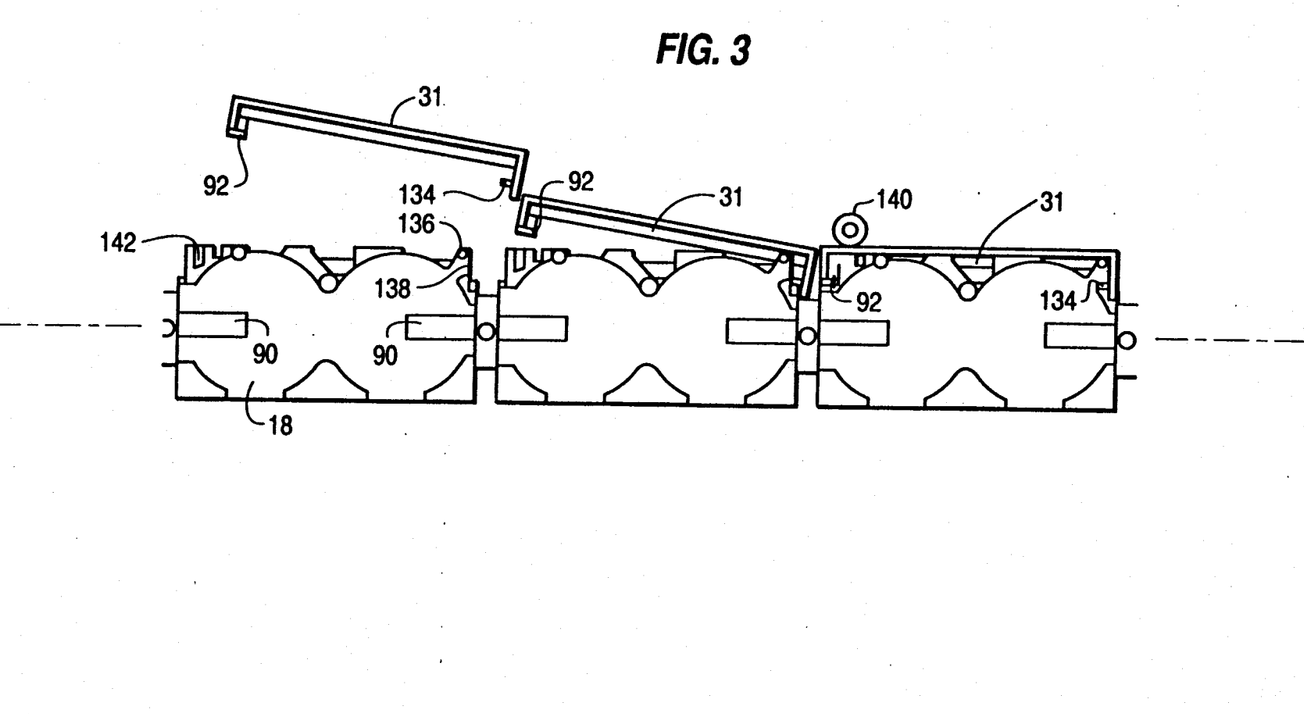
FIG. 3 is a top view of dust door being moved toward a shell cover.

Reference is made to FIGS. 1A and 3 for describing the dust door station 30. As discussed above dust doors 31 with springs 92 already attached are transported to the assembly line 10 by an accumulating conveyor (not shown). At this station 30, the dust door 31 is positioned with a shorter pivot shaft 134 thereof just forward of the cover 18 front edge 136 that has a mating hole 138. During transfer dwell the dust door 31 is moved into position with the shorter pivot shaft 134 directly in front of the mating hole 138. On the next shell transfer cycle the shorter dust door pivot shaft 134 is driven into the mating hole 138 where it bottoms out, allowing the dust door 31 to be pulled along with the cover 18. The dust door 31 is pulled under a soft roller 140 which drives the spring 92 over a mating tab 142 on the cover 18. This dust door 31 insertion technique allows a full cycle time instead of 60% to accomplish the task.

Most conventional video cassettes have two plastic guide rollers that ride on plastic shafts which are an integral part of the shell base 20. To prevent the roller from sticking and fluttering, a drop of lubricant is applied to the roller shaft prior to roller insertion. As is known in the art, the pin lube station 32 is composed of an oil tank 143, a rotary pick up shaft 145 with two wheels and a linear motion drop transfer mechanism 147. Lubricant adheres to the rotating wheels and is deposited onto the drop transfer mechanism 147. The transfer mechanism 147 moves in on each cycle and deposits a drop of lubricant on both roller shafts at the same time.

At the plastic roller station 34, two rows of plastic rollers are fed from a vibratory bowl 144 to a singulator insert mechanism 146. Both rollers are inserted together during a transfer dwell when a base 20 is present.

The guidepost sleeve station 36 also utilizes a vibratory bowl 148 and singulator insert mechanism 150 like the plastic roller station 34. Both guidepost sleeves (not shown) are inserted together during a transfer dwell when a base 20 is present. There is a notch on both sides of the sleeve (see, e.g. U.S. Pat. No. 4,313,551) which needs to be oriented with a projection on the post that the sleeve is mounted over.

Most video cassettes also include recording prevention devices formed in the cassette exterior. They are usually rectangular tabs connected to the cassette base which, when removed, prevent recording of the tape. The tab knockout station 38 removes the tab (not shown), if desired, as known in the art.

After the guidepost sleeves are inserted, and the tab removed, the base 20 is indexed to the guidepost sleeve orient station 40. At this station two rotating drive wheels 152, 154, that are skewed to the sleeves, drive the sleeves downward while rotating them until the notches described above engage the projections. The drive wheels 152, 154 are spring loaded and slippage occurs when the sleeves stop rotating. If the line 10 cycle stops, the drive wheels 152, 154 also stop to prevent marring the sleeves.

The dust door latch station 78 is very similar to the reel lock station 28 described above using a one piece reel lock because, preferably, a one-piece dust door latch is used, such as the one described in co-pending U.S. patent application Ser. Nos. 07/389,401, entitled "Integral Dust Door Latch/Spring", or 07/562,004, entitled "Video Cassette Dust Door Latch", the disclosures of which are expressly incorporated herein, as opposed to a multi-piece latch, such as described in Assignee's U.S. Pat. No. 4,475,700, entitled "Tape Cassette Dust Door Latch Spring Assembly".

Latches (not shown) are fed from a vibratory bowl 174 to a singulator insert mechanism 176. The base 20 is not restrained during insertion. When the latch is inserted it is not fully seated in the base 20; it is properly seated at the closing station 80 described below, when the base 20 is restrained.

Referring again to FIG. 1B, at the reel leaf spring station 44, leaf springs 164 such as those described in Assignee's U.S. Pat. No. 4,662,579, entitled "Coined Reel Leaf Spring for a Video Tape Cassette", U.S. Pat. No. 4,986,491, entitled "Reel Leaf Spring/Cassette Cover Combination and Methods for Assembly"; and co-pending U.S. patent application Ser. No. 07/629,641, entitled "Reel Leaf Spring/Cassette Cover Combinations and Methods for Assembly", the disclosures of which are expressly incorporated herein, are stacked in magazines 160 that hold approximately 1500 springs each. There are two magazines 160 at the spring station 44; one is active and the other is in reserve. The magazines 160 shuttle-in under a dual head pick and place head 162 to be unloaded, and out for removal, automatically allowing the station 44 to insert springs 164 without interruption. The pick and place head 162 simultaneously places a spring 164 into a cover 18 while picking a spring 164 from the magazine 160. On the next cycle the head 162 rotates and repeats the operation. Welding can be eliminated as the spring 164 can be locked into position with a minimal insert pressure, as described in the above-cited U.S. Pat. No. 4,986,491. A pressing member 165 can be supplied for this purpose.

Figure 4:
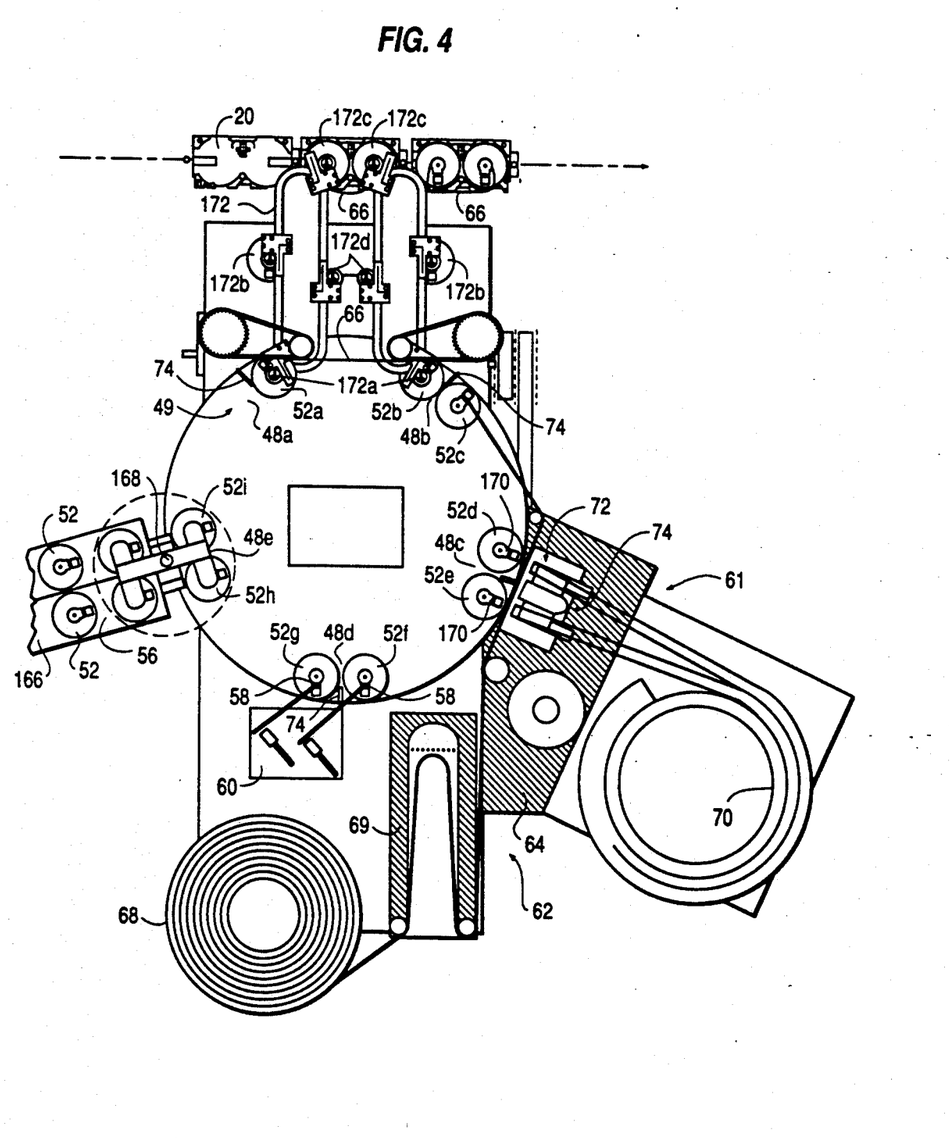
FIG. 4 is an enlarged plan view of the tape reel leadering and placement station shown in FIG. 1.
Figure 5:
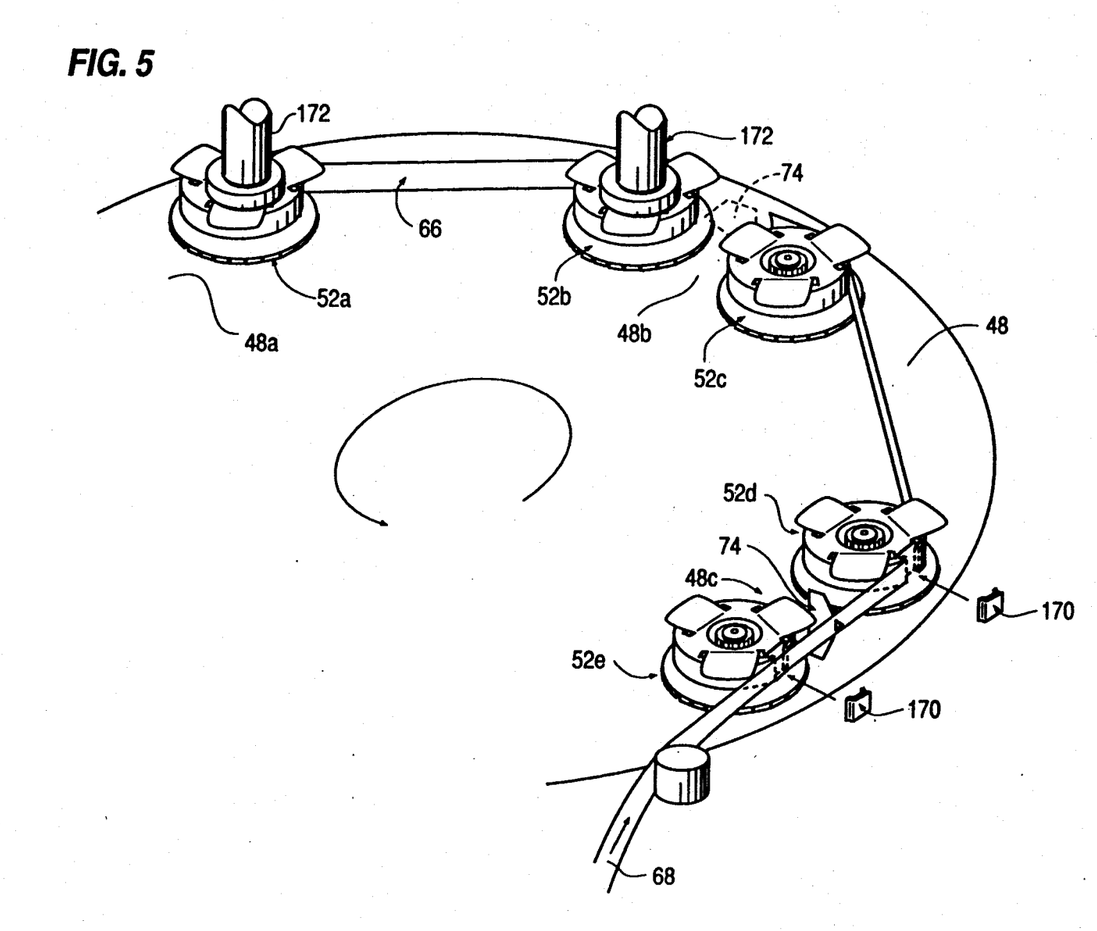
FIG. 5 is a perspective view of a portion of the rotary table shown in FIGS. 1 and 4.

The tape reel leadering and placement station 46 shown in FIG. 1B, 4 and 5 can be considered a totally separate machine with its own substations. Three major activities occur at this station: (1) pairs of unleadered tape reels 52 are continuously transferred to the rotary table 48 at radially spaced locations; (2) the tape reels 52 are leadered on the rotary table 48; and (3) the means for transferring 76 sets each leadered tape reel 52 pair into a cassette base 20.

As can be seen, unleadered and leadered pairs are involved in this assembly. However, as will be clear from the following description, the two tape reels making up an "unleadered pair" are not the same two tape reels which make up a "leadered pair". Instead, one tape reel from an unleadered pair and an opposing, trailing tape reel from an unleadered pair are connected by a leader to form a leadered pair.

With particular reference to FIGS. 4 and 5, unleadered tape reels 52 are conveyed by reel supply means 56 to the tape reel leadering and placement station 46. In this regard, one-piece tape reels as described in Assignee's above-referenced U.S. Pat. No. 4,993,655 are shown in FIG. 5. However, pre-assembled multi-piece tape reels could also be used, as indicated above. The tape reels 52 are accumulated into two parallel rows on a continuous running flat accumulation belt 166 that will not scratch the tape reels 52. A dual head rotary pick and place 168 picks two unleadered tape reels 52 from the accumulator belt 166 and simultaneously sets them adjacent each other on the rotary table 48 using vacuum heads. There are five radially spaced areas, 48a-e on the rotary table 48, each having a pair of posts (one post, 49, is shown in FIG. 4) intended to receive unleadered tape reels 52.

At start up, only a single unleadered tape reel 52a (hereinafter referred to as the "first" tape reel) is placed on the post 49 at the clockwise position of the two positions in area 48a. The remaining, adjacent post 49 in the counter clockwise direction is left empty as will be understood hereafter. Between the posts 49 of each area 48a-e, there is located a cutting means 74 in the form of a knife.

The rotary table 48 then rotates counterclockwise to position the first tape reel 52a at the orient station 60 where the leader clip recess 58 of the first tape reel 52a is positioned to face radially outward. This station 60 compensates for differences in diameters between the GT-120 and GT-60 tape reels automatically. A pair of unleadered tape reels 52b, 52c (hereinafter referred to as the second and third tape reels, respectively) is placed on the posts 49 of the area 48b, and so on for unleadered tape reel pairs 52d, 52e, 52f, 52g, 52h and 52i shown in FIGS. 4 and 5, with each rotation of the rotary table 48.

The first tape reel 52a is then indexed to the leader supply/clip/cutting station 61. At this station the leader supply 68 is fed through a vacuum column 69 (to eliminate slack) to the first tape reel 52a by the means 64 for feeding the leader supply 68. Simultaneously, the means 72 inserts a leader clip 170 into the recess 58 of the first tape reel 52a. More particularly, a vacuum block (not shown) holds the leader supply 66 in place against the first tape reel 52a, as a leader clip 170 is pushed in.

The rotary table 48 then rotates again counterclockwise to present second and third tape reels 52b and 52c to the leader supply/clip/cutting station 61. The leader supply 68, attached to the tape reel 52a, is pulled across the second and third tape reels 52b and 52c as the rotary table 48 rotates. Simultaneously, again, vacuum blocks (not shown) hold the leader supply 66 in place as leader clips 170 are pushed into the recesses 58 of the second and third tape reels 52b and 52c and the knife 74 is activated at the station 61 to single cut the leader supply 68 between the second and third tape reels 52b and 52c.

As noted above, there are five knives 74 on the rotary table 48. However, only one knife 74 is activated at a time, i.e., only when a knife is at the leader supply/clip/cutting station 61.

Thus, the first and second tape reels 52a and 52b, now connected by a separate leader 66, become a leadered pair, and third tape reel 52c becomes the forward tape reel for the next leadered tape reel pair 52c and 52d. In effect, the cut end of the leader supply 68 becomes the leader 66 for the next, second tape reel 52c of an unleadered pair in the clockwise direction which has, by way of the rotating table 48, been moved to the leader supply/clip/cutting substation 61.

As noted above, with the conventional leadering method, a double cut is used, which results in leader scrap. With the present invention, because the adjacent tape reels of sequential pairs are closer together than is conventional, and since a single cut is used, no scrap is produced so this excessive waste is avoided.

This specific rotation of the rotary table 48 (each time the rotary table 48 indexes, it rotates 72°), as well as the equal radial spacing of the tape reels of a leadered pair e.g., 52a, 52b serve to measure the leader 66 predictably and reliably every time so that there is no variation in leader lengths from one cassette to another, which greatly facilitates automatic tape loading.

The rotary table 48 rotates again counterclockwise and presents the leadered pair of reels 52a and 52b at the means for transferring 76. The pick and place 172 removes the leadered pair of tape reels 52a and 52b from the rotary table 48 and simultaneously inserts the pair into a cassette base 20 on the open shell conveyor 17, with the leader 66 threaded at the front open area of the base 20 through the various pins, guides, etc. There are four positions on this pick and place 172: position 172a where a leadered set is picked up; an intermediate position 172b with a leadered set; position 172c for inserting a leadered set in a base 20, and another intermediate position 172d with empty heads. It is during the position 172c for inserting a leadered set, that the leader 66 is thread along the front, open area of the cassette, amongst the guides, etc.

Although the above description of the leader supply/clip/cutting station relates to leadering tape cassettes for VHS video cassettes, it is to be understood that the present invention is not to be limited thereto. Instead, the invention can be used to leader 8 mm, RDAT, reel-to-reel tape cassettes or any other tape reel pair.

At the pressure flap station 42, pressure flaps (not shown), such as those described in Assignee's U.S. Pat. Nos. 4,569,492, entitled "Tape Cassette Pressure Flap Assembly" and 4,606,513, entitled "Tape Cassette Pressure Flap Assembly", the disclosures of which are expressly incorporated herein, are fed from a roller (not shown), to a cutter mechanism (not shown) and to a vibratory bowl 156. Each pressure flap is transferred to a head of a rotary index mechanism 158 while a pressure flap on the opposite side of the mechanism 158 is pushed down into a located base 20. Low pressure vacuum is used to hold the flap on the index mechanism 158.

The closing station 80 is the last three positions on the open shell conveyors 17. When these three positions are filled with shells, both the covers 18 and bases 20 are slid off the conveyors 17 to the side (downward in FIG. 1B) during dwell. This allows the open shell conveyors 17 to continue to run, filling the three empty positions while the closing station 80 puts all three of the cassettes 88 together. Mating the base and cover of each video cassette 88 requires more time than any of the other functions; therefore, closing station 80 closes three cassettes 88 at the same time to allow the line 10 to run at the designed rate of 60 parts per minute. The closing station 80 takes approximately two and a half seconds to complete its task.

Three vacuum heads (not shown) mounted on a cam track 178 come up under the covers 18 taking them up and onto the tops of the bases 20. The vacuum heads then return to the starting position before the start of the third dwell when three more shell covers 18 are slid over the tops of the bases 20.

The closed cassettes 88 are now sitting on the closed shell conveyor 19 that moves three positions at a time. Movement begins at the same time as the cam track 178 starts to return to its original position.

As shown in FIG. 1C, the first reject station 82 is at the closing station 88 on the open shell conveyors 17. If any of the components are not present in either the cover 18 or base 20, when they get to the closing station 80, those pairs are not removed from the respective open shell conveyor 17. They continue on to the end of the open shell conveyor 17 where they slide into reject bins.

The non-rejected cassettes 88 move on to the screw insert stations 89. The installation of the screws (not shown) also requires more time than would be available at 60 parts per minute, therefore there are three screw machines 84a, 84b, 84c located on the closed shell conveyor 19 that simultaneously fasten three cassettes 88 together. At the next index position all the screws are checked for presence and height.

That is, there is a second reject station which is a screw inspect station 86. A defect found here causes the cassette 88 to be slid off the closed shell conveyor 19 into another reject bin.

All cassettes 88 that are rejected at the first and second reject stations can be reworked and fed back into the production line at a later stage. In this regard, many of assignee's components have been designed to be easier to remove and replace, such as the reel leaf spring, so repairing rejects or recycling is facilitated, as discussed more fully in the above-referenced patents and pending applications of the Assignee herein.

The assembled cassettes have the leader 66 exposed at the front thereof. This exposed leader is taken up by automatic tape winding machines. Since the present invention assures the same length leaders will result for every cassette, the take up of the leader by the automatic tape winding machine is greatly facilitated.

As noted above, the conventional assembly line uses time wasting back and forth motions to advance components. In contrast, the present invention "continuously" forward feeds the shells and tape reels. By "continuous" is meant forward feeding, so that no station needs to wait for a component, not a back and forth motion. Of course, "continuous" does not exclude halting the assembly for repair, testing, etc.

For example, the conveyors 17 continuously supply shells to the stations; the belt 166 continuously feeds unleadered tape reels 52 to the pick and place 168; the rotary table 48 continuously moves forward to leader and feed tape reels 52 to the means for transferring 76, and this means 76 continuously loads leadered tape reels 52 into the cassette shells, as other leadered tape reels are being picked up. This avoids the wasted back and forth motion of the conventional methods and significantly increases production efficiency.

Figure 6:
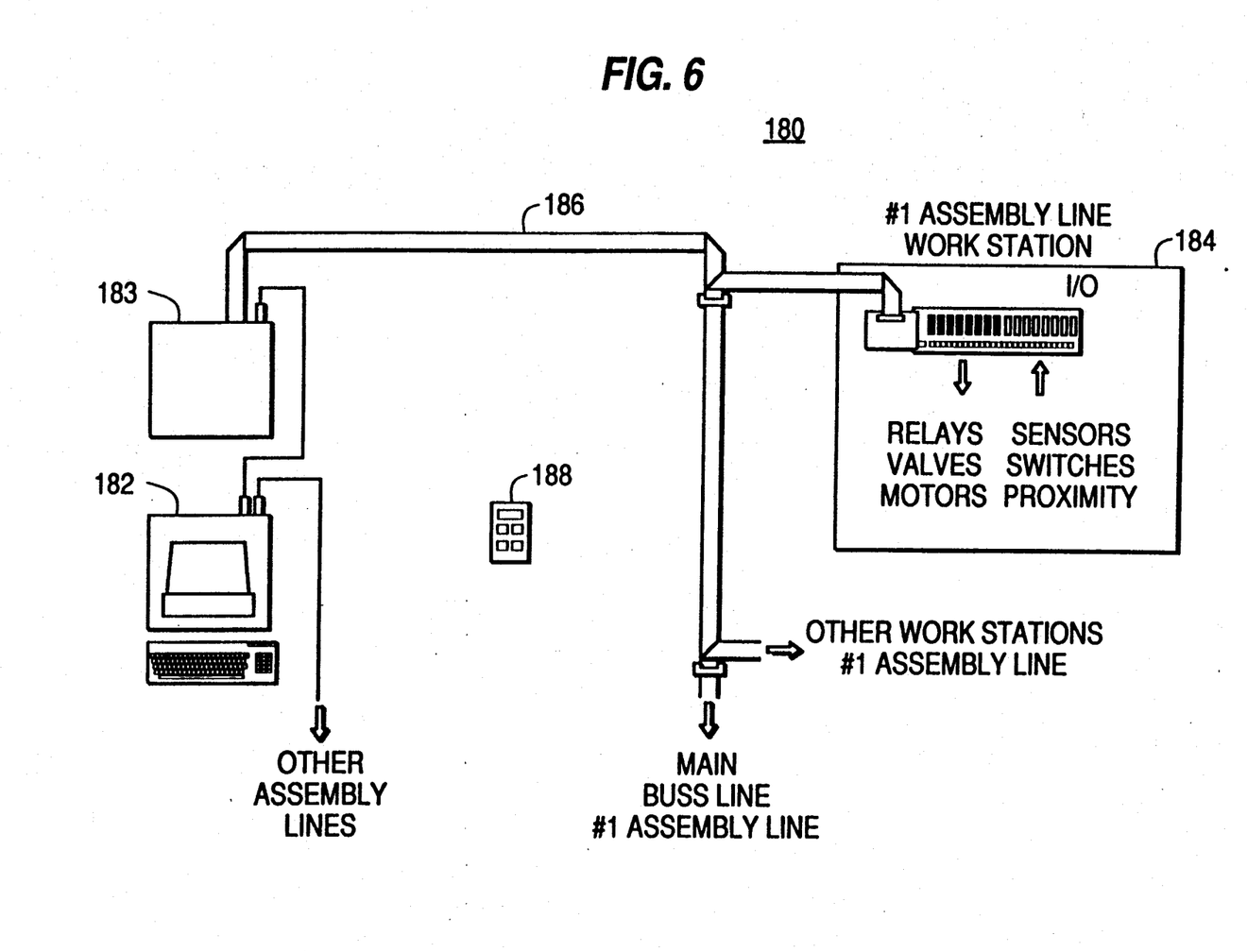
FIG. 6 is a schematic view of the assembly line control system according to the present invention.

As seen in FIG. 6, the control system 180 of this assembly line 10 uses a host computer 182, preferably a single 32 bit IBM compatible computer, input/output card devices 184 located at each work station and an interface 183 in between. The devices 184 control the relays, valves, motors, etc. of each work station and receive signals from sensors at each station. Several assembly lines can be controlled/monitored using a single host computer 182. This control system 180 eliminates all of the interconnecting wiring that would normally be required on similar types of equipment. All circuit components needed for the function of a station are mounted on the station with every input/output terminated at the respective input/output card device 184. The only interconnecting wiring between stations and the computer 182 is through a computer ribbon 186.

Using the input/output card devices 184 allows complete production reporting including system up time, station up time, major downtime reasons, production through-put, rejects, rejects by station, etc., for the whole production line 10 and each station. All data is upgraded every 60 seconds and down loaded to the host computer 182. Personnel with a proper access code can retrieve the data at anytime.

Operators and technicians access the assembly line 10 control computer 182 through use of a remote control hand held device 188 which controls the computer 182 of the assembly line and the work stations' operation. For example, the speed of a particular station can be controlled remotely. This device uses an infrared beam that must be pointed at a receiver (not shown) before any command can be initiated. Operators and technicians are free to roam anywhere around the equipment and still be in complete control of the system. An emergency stop control is an isolated hard wired function.

If the technician is required to make a repair and does not want the system started, he will use his access code to prevent anyone from starting the system before the repairs have been completed. Anyone operating the assembly line 10 will have an access code that only they know and that code can only be changed by an authorized person.

The foregoing is considered illustrative only of the principles of the invention. Further, since numerous modifications and changes will readily occur to those skilled in the art, it is not desired to limit the invention to the exact construction and operation shown and described. For example, although the preferred embodiment described above emphasizes the use of the invention for assembling VHS video cassettes, the invention can also be used to produce other tape or film devices where tape leadering is required. Accordingly, all suitable modifications and equivalents may be resorted to that fall within the scope of the invention and the appended claims.

What is claimed is:

1. A method for assembling a cassette, comprising the steps of:
    (a) conveying a cassette shell base and cassette shell cover along an assembly line;
    (b) supplying a first tape reel to a movable member;
    (c) moving the movable member;
    (d) supplying second and third tape reels to the movable member, adjacent each other but spaced from the first tape reel;
    (e) feeding leader supply to the first tape reel;
    (f) connecting said leader supply to said first tape reel;
    (g) moving the movable member so that the leader supply extends across the second and third tape reels;

(h) connecting the leader supply to the second and third tape reels;
(i) cutting said connected leader supply between the second and third tape reels from the remainder of said leader supply; and
(j) transferring the first and second tape reels, connected by the leader, from the movable member to the cassette shell base.

2. The method as recited in claim 1, wherein step (g) comprises rotating the movable member.

3. The method as recited in claim 1, further comprising the steps of installing, into the cassette shell base:
a reel lock;
a plastic roller;
a guidepost;
a dust door latch; and
a pressure flap.

4. The method as recited in claim 3, further comprising, the steps of installing, into the cassette shell cover:
a dust door, and
a reel leaf spring.

5. The method as recited in claim 4, wherein the step of installing the dust door comprises: positioning the dust door, with a spring attached and with a pivot shaft, just forward of a cassette shell cover front edge that has a mating hole, fitting the dust door pivot shaft into the mating hole and, pulling the dust door along with the cover under a member which drives the spring over a mating tab on the cover.

* * * * *